United States Patent
Christy et al.

(10) Patent No.: US 12,455,390 B2
(45) Date of Patent: Oct. 28, 2025

(54) PROTON COMPUTED TOMOGRAPHY USING MULTICHANNEL GAS DETECTION TECHNOLOGY

(71) Applicant: JEFFERSON SCIENCE ASSOCIATES, LLC, Newport News, VA (US)

(72) Inventors: M. Eric Christy, Seaford, VA (US); Cynthia Keppel, Newport News, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 271 days.

(21) Appl. No.: 18/222,131

(22) Filed: Jul. 14, 2023

(65) Prior Publication Data

US 2024/0019593 A1 Jan. 18, 2024

Related U.S. Application Data

(60) Provisional application No. 63/389,385, filed on Jul. 15, 2022.

(51) Int. Cl.
*A61B 6/03* (2006.01)
*G01T 1/164* (2006.01)
*G01T 1/205* (2006.01)

(52) U.S. Cl.
CPC ............. *G01T 1/205* (2013.01); *A61B 6/032* (2013.01); *G01T 1/1641* (2013.01)

(58) Field of Classification Search
CPC ....... G01T 1/205; G01T 1/1641; G01T 1/185; G01T 1/2985; G01T 1/2935; A61B 6/032; A61N 5/1038; A61N 5/1049; A61N 2005/1087; G01N 2223/107; G01N 23/046

See application file for complete search history.

(56) References Cited

U.S. PATENT DOCUMENTS 6,011,265 A 1/2000 Sauli
7,432,510 B2 10/2008 Yeo

OTHER PUBLICATIONS

Bortfeldt et al. (2020) "Status of Gaseous Detector R&D for a Small Animal Proton Irradiation System" RD51 Collaboration Meeting Oct. 5-Oct. 9, 2020.*
Sebastian Meyer, Optimization and performance study of a proton CT system for pre-clinical small animal imaging, (PAPER) Phys. Med. Biol. 65 (2020) 155008, Jul. 31, 2020, pp. 1-12, vol. 65, .IOP Publishing.

* cited by examiner

*Primary Examiner* — Courtney D Thomas

(57) ABSTRACT

A Proton Computed Tomography (pCT) system utilizing proton beams for construction of 3-dimensional density maps of both test phantoms and living tissue. PCT is a much sought-after modality for treatment planning and validation at proton therapy treatment centers, as it would allow in situ imaging with the same beam that is used for the treatment. A pCT system according to the present invention includes gaseous detectors for tracking and energy reconstruction, a shutter system to extend dynamic range features while maintaining good energy resolution, and a method for determining proton energy from a forward-search algorithm utilizing segmentation of energy detector ionization signal readout. The gaseous detectors are Gas Electron Multiplier (GEM) based gaseous detectors.

18 Claims, 3 Drawing Sheets

PROTON COMPUTED TOMOGRAPHY USING MULTICHANNEL GAS DETECTION TECHNOLOGY

This application claims the priority of Provisional U.S. Patent Application Ser. No. 63/389,385 filed Jul. 15, 2022.

The United States Government may have certain rights to this invention under Management and Operating Contract No. DE-AC05-06OR23177 from the Department of Energy.

BACKGROUND OF THE INVENTION

Although proton Computed Tomography (pCT) has been discussed for many years as a possible device for in situ proton beam treatment planning and validation at proton treatment centers, it is believed that no viable commercial design has been developed. Although similar devices have been proposed,—none utilize a shutter system for extending energy range or utilizing a fit-to-energy loss profile to improve resolution. Conventional pCT systems typically use X-ray CT to image a specific tissue for proton delivery. The pCT system of the present invention uses actual treatment beams (proton imaging for proton delivery as opposed to X-ray imaging for proton delivery), thereby better modeling and controlling the passage of the radiation through the patient.

BRIEF SUMMARY OF THE INVENTION

A Proton Computed Tomography (pCT) system utilizing proton beams for construction of 3-dimensional density maps of either test phantoms or living tissue. PCT is a much sought-after modality for treatment planning and validation at proton therapy treatment centers, as it would allow in situ imaging with the same beam that is used for the treatment. A pCT system according to the present invention includes (a) the use of a shutter system to extend dynamic range features while maintaining good energy resolution; the shutter encoder will be recorded in the data stream for automatic correction of the energy loss in the shutter, (b) the use of Gas Electron Multiplier (GEM) based gaseous detectors for tracking and energy reconstruction, and (c) the provision of a method for determining proton energy from a forward search algorithm utilizing segmentation of energy detector ionization signal readout.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION OF THE INVENTION

The invention described herein is a proton Computed Tomography (pCT) system for: (a) superior treatment accuracy associated with improved patient alignment prior to proton radiation therapy; (b) adaptive planning capability enabling plan checking and planning during proton therapy patient treatments; (c) reduction in range uncertainty associated with proton stopping power conversion; and (d) patient radiation dose reduction in treatment planning.

The main advantages of proton therapy are the reduced total energy deposited in the patient as compared to photon techniques and the finite range of the proton beam. The latter adds an additional degree of freedom to treatment planning, negating the need to consider distal delivery. The range in tissue is, however, associated with considerable uncertainties caused by imaging, patient setup, beam delivery and dose calculation. Reducing these uncertainties would allow improved utilization of the advantages of protons. Very generally, the technology here proposed will, for reasons (a)-(d) facilitate this better utilization of the advantages of protons due to uncertainty reduction.

We note that the invention described herein could also be applicable to hadron therapy in general, such as Carbon ion therapy. The technique could, moreover, be used to image animals or non-living targets.

Figure 1:
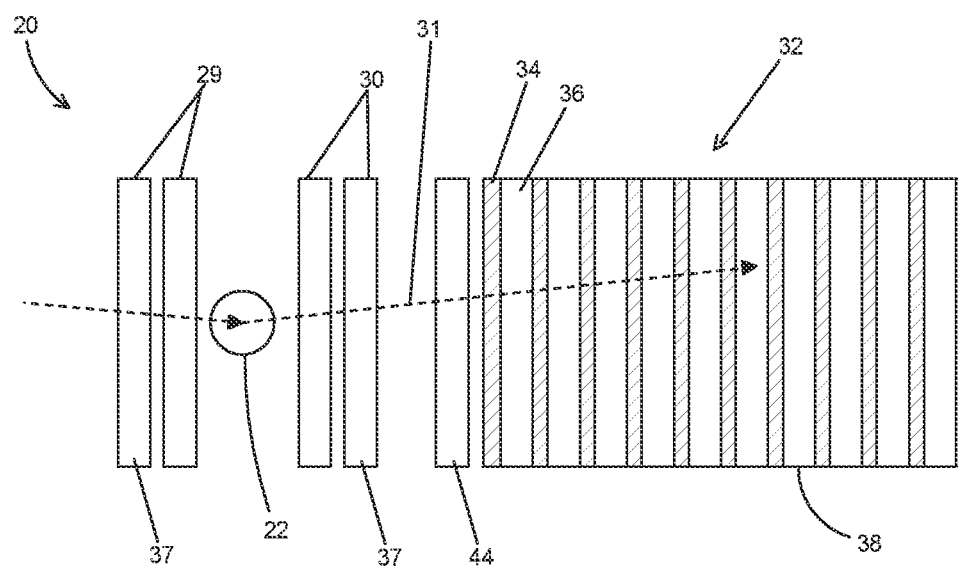
FIG. 1 is a schematic depicting the layout of a proton Computed Tomography (pCT) system according to the invention.

With reference to FIG. 1, a pCT system 20 according to the present invention would include a patient 22 (or imaging target) situated between a pair of proton tracking detectors, including a pre-tracker 29 and a post-tracker 30, which determine the proton trajectory 31 both before and after passing through the phantom/tissue, and an energy measurement device 32 to determine the proton energy after exiting the imaging target 22. Trajectories are tracked to determine the position of the proton in a plane perpendicular to the beam direction and are combined with the energy information to allow a determination of a 2-dimensional density map of the tissue. Rotation of the phantom/tissue allows density maps for multiple planes which can then be used to construct a 3-dimensional density map based on CT algorithms.

The gaseous tracking detectors 29 and 30 are micropattern gas detectors, based on Gas Electron Multiplier (GEM) technology, identify the type, position, trajectory, and energy of an "incoming" proton or other ion. The proton energy measurement device 32 is preferably a gaseous detector consisting of a series of inert energy absorbers 34 alternating with active gas cells 36 for measuring the energy lost by protons traversing the material. The energy deposited by protons through ionization in each gas cell 36 is used to determine an energy deposition profile along the trajectory. This profile can then be matched to the expected profiles to determine the proton energy entering the energy device based on a forward-search algorithm.

For proton therapy, it is envisioned that a beam of higher-than-treatment energy and lower-than-treatment current/dose would be delivered such that a reduced dose of maximal energy deposition (the Bragg Peak) would be deposited in the post-tracker 30. Such a system could be implemented on a proton therapy treatment gantry (not shown). Each tracker includes a set of two GEM chambers 37 with a 0.4 mm readout strip pitch which easily fulfills the tracking requirements.

In a pCT system 20 according to the present invention the object being scanned is rotated and scanned along a different axis. The various scans are then combined to create a CT image.

The focus is on the energy measurement device 32, which includes two competing requirements: (1) dynamic range of energy loss, and (2) energy resolution. The energy measurement device can include active segmented scintillator stacks, which can be used as a simple ranger or to provide dE/dx vs z, which would include good dynamic range. Alternatively, the energy measurement device may include inert absorbers that would include a much smaller dynamic range for similar length and most likely improved resolution As one example, the energy measurement device 32 may include a plurality of MYLAR® absorbers. A specific arrangement for 75 MeV beam energy may include 64×0.5 mm absorbers for a total absorber thickness of 3.25 cm. The total stopping distance in the MYLAR® absorbers=4.95 g/cm2/1.38 g/cm3=3.59 cm. The rest of the stopping power in the energy measurement device is provided by the gas and the entrance window. The resolution is determined by individual absorber stopping power if only measuring range. In this specific example absorbers dE~3 MeV. Reducing the absorber thickness to 0.25 mm reduces this to dE~1.5 MeV, which also reduces the dynamical range from 75 MeV→30 MeV. The cost of better resolution at low E is a smaller dynamic range without doubling the length to ~1 m. 100 MeV protons would require significantly longer energy device.

A second and preferred embodiment of the energy measurement device 32 includes a Mylar absorber thickness of 0.3 mm with 50 gas cells for a total length per cell of 1 cm. This gives an energy range for protons stopping in the device of up to 48 MeV. The reconstructed energy resolution is less than 300 keV on average across this energy range based on fitting the energy loss profile and including a measurement resolution of 10% per cell (not including the energy straggling), wherein the term "energy straggling" is defined as the distribution of energies for ions of the same initial energy after they've traversed the same length in a medium. This thickness of the absorbers effectively stops protons with less than 1 MeV kinetic energy so the reconstructed resolution is much improved over conventional pCT devices based on stopping position only, especially for the lower energies.

The energy range can be increased without increasing the length or sacrificing the resolution at low E by use of a shutter system or shutter box 44. The shutter box 44 includes a thick energy degrader 45 to enable taking data with and without the shutter to increase the dynamic range of the energy measurement device. Although the insertion of an energy degrader from the shutter box will degrade the resolution slightly, many events with energies less than 48 MeV will be recorded with the shutters out. The device would be run for short periods with all combinations of shutter positions to provide the largest energy coverage while retaining events with optimized resolution at lower energies.

With reference to FIG. 1, the proton energy measurement device 32 consists of a gaseous Time Projection Chamber (TPC) 38 and a variable energy degrading shutter system 44 with the latter utilized to extend the dynamic energy range of the device. This allows the TPC to remain of relatively short length and able to fit behind patients in typical proton therapy treatment rooms while allowing a significant dynamic energy range. The TPC 38 consists of a series of absorbers 34 equally spaced in order to divide the TPC into a plurality individual cells 36. Most preferably the absorbers are plastic film absorbers. The ionization produced in each gas cell 36 by protons passing through the gas remains isolated to each cell 36.

Figure 2:
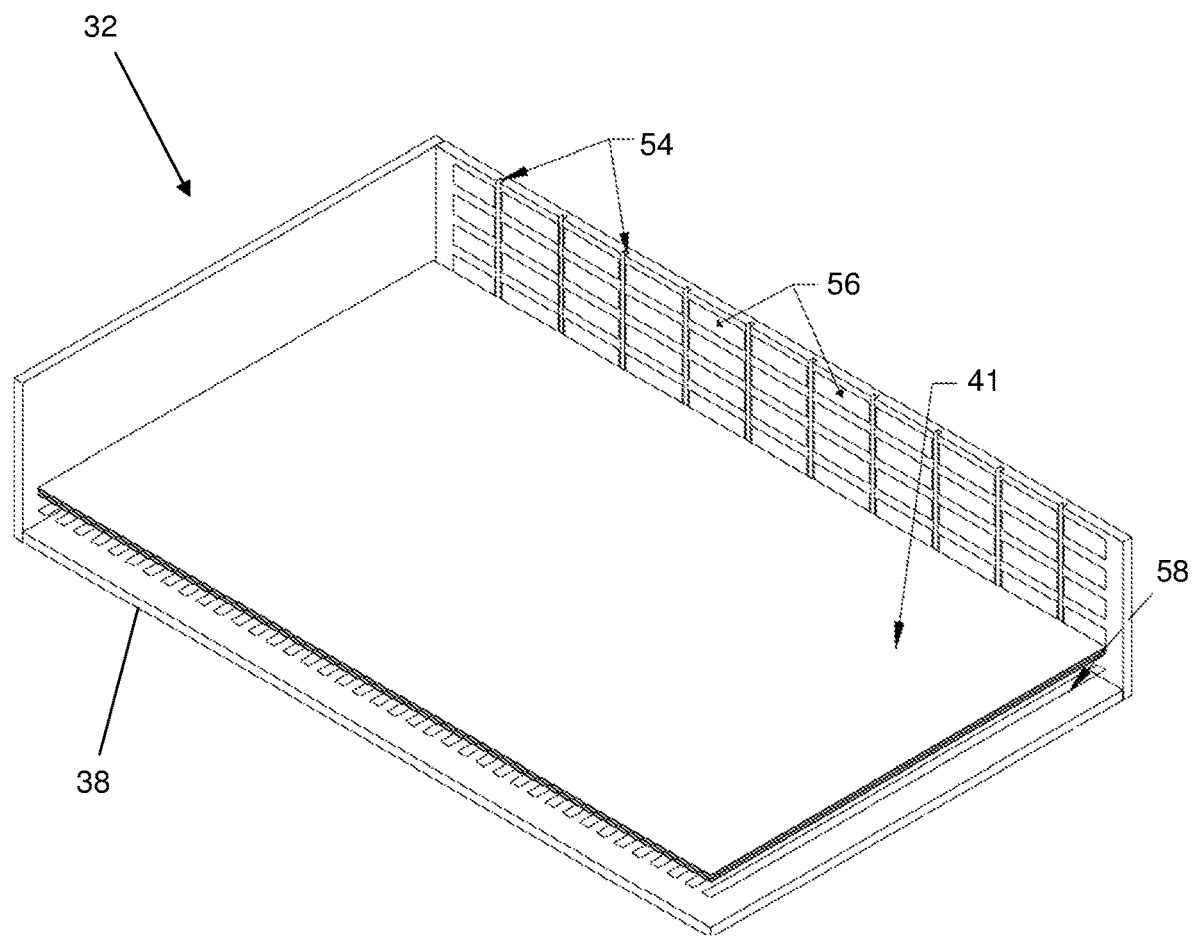
FIG. 2 is a perspective view of a Time Projection Chamber (TPC) that forms the energy reconstruction portion of the pCT system of FIG. 1.

With reference to FIG. 2, the ionization electrons are drifted downward in each gas cell 36 by an applied electric field, and are amplified via being directed through multiple Gas Electron Multiplier layers 41 to an electronic readout layer 42, consisting of a collection of segmented electrodes on a PCB. The electric pulse generated by the electrons via induction are amplified and processed by front end electronics and sent to a computer for further processing. The signals from the readout electrodes can be grouped based on which specific cell 36 they cover. The Time Projection Chamber (TPC) 38, which in FIG. 2 includes the top and two sides removed for clarity, includes one or more grooves 54 for insertion of absorber frames (not shown), one or more field cage electrodes 56, and readout electronics 58. The energy device 32 provides good energy resolution of a few percent over a large dynamic range while keeping the length of the energy device small enough to fit into conventional treatment gantries. This limitation of the length to a half meter or less limits the dynamic range for protons stopping in the device (necessary for the best resolution) to about 45 MeV with a typical inert working gas at atmospheric pressure. Most preferably the electric field applied to the gas cells is 1 kV/cm. The total integrated charge of each induced pulse is proportional to the number of ionized electrons produced, while the total number of ionized electrons produced in each cell is proportional to the energy lost by protons passing through the gas. By grouping clusters of signals from each cell, a determination of the energy deposited in each cell can be reconstructed. Both the stopping distance along the proton trajectory and the profile of the energy lost along the proton track can be used as discriminators for determining the energy of the proton entering the device given knowledge of the material and thickness for both the absorbers 34 and the gas cells 36. For optimum resolution of the proton reconstructed energy, it is necessary for them to lose all their energy within the device. In addition, the much denser absorbers should be very thin relative to that of each gas cell. Simulations have verified that the use of GEM amplification layers result in reconstructed energy resolution per cell of better than 10% after calibration of the device. This in turn allows a reconstructed resolution of protons stopping in the device of better than 300 keV via an algorithm which matches the measured energy loss profile—including statistical fluctuations—to that of expected for protons based on maximum likelihood.

Figure 3:
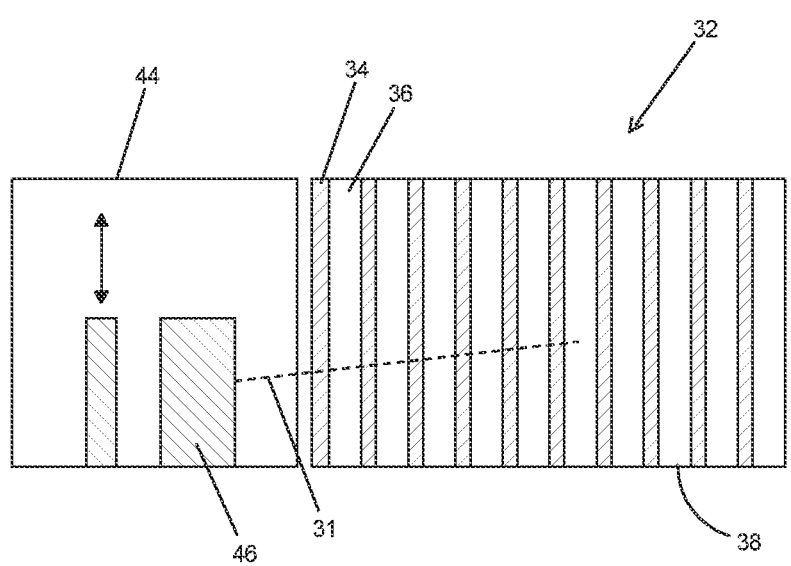
FIG. 3 is an illustration of a variable energy-degrading shutter system that forms a portion of the pCT system of the present invention.

Referring to FIG. 3, the dynamic range (determined by the maximum energy for protons stopping in the device) can be extended by the insertion of a shutter box 44 including a series of energy absorbing shutters 46 near the entrance of the energy device at the cost of a small increase in the energy resolution for the higher energy protons. The shutter box 44 allows the insertion of different thickness absorbers 46 before the energy device. An encoder records which thickness absorbers are inserted, allowing the average energy lost by protons in the shutter box to be determined and added to the energy reconstructed from the TPC 38 to determine the energy of the proton upon exiting the patient. As the energy lost falls within a narrow probability distribution, the use of the shutter box with inert absorbers does slightly degrade the reconstructed energy resolution. However, the shutter box absorbers can consist of different thickness scintillators for which the signal can be recorded. This allows an active monitoring of the energy deposited by each individual track, recovering most of the resolution degradation.

The information from the shutter system 44 is recorded when the device is in use and is utilized in the reconstruction of the proton energy. Such a device would facilitate (a) superior treatment accuracy, (b) adaptive planning, and (c) range uncertainty reduction as described hereinbelow.

Superior Treatment Accuracy

Radiotherapy typically begins with a treatment plan based on a detailed X-ray Computed Tomography (CT) image. With a plan ready to implement, clinicians may acquire another planar X-ray or CT image immediately before treatment commences, to ensure correct patient alignment consistent with what was planned. Pre-treatment alignment is typically done before every treatment delivery fraction (usually many deliveries). Alignment is critical to proton and other ion therapies as clinical advantage is gained via the delivery of high doses of radiation delivered precisely to planned treatment volumes. The technology herein uses actual treatment beams (proton imaging for proton delivery as opposed to X-ray imaging for proton delivery), thereby better modeling the passage of the radiation through the patient.

Adaptive Planning

Adaptive radiation therapy planning involves modifying the radiation treatment plan delivered to a patient during a course of radiotherapy to account for temporal changes in anatomy (e.g. tumor shrinkage, weight loss or internal motion) or changes in tumor biology/function (e.g. hypoxia). To facilitate adaptive planning, precision images that can be used to compare planning and on-treatment-day tumor and patient anatomy are necessary. In this embodiment, the pCT data would be used to evaluate discrepancies between the planning and pre-treatment images. From this data, algorithms to correct positions and/or modify treatment plans for these discrepancies could be deployed.

Range Uncertainty

When proton-therapy treatment plans are produced from X-ray tomographic images, medical physics teams convert X-ray attenuation information, largely based on target electron density, to relative stopping power for protons. Using protons for imaging in treatment planning avoids the somewhat substantial uncertainties associated with this conversion. Reducing proton range delivery uncertainty facilitates optimal therapeutic delivery of proton beams. While the high dose-gradient of proton therapy enables the delivery of high doses to the tumor while sparing critical organs distal to the target, a small shift of the highly conformal high-dose area can cause the target tumor to be substantially under-dosed or the critical organs to be substantially over-dosed.

Some of the novel features of the proton Computed Tomography (pCT) system of the present invention include (a) the use of a shutter system to extend dynamic range features while maintaining good energy resolution, i.e., the shutter encoder will be recorded in the data stream for automatic correction of the energy loss in the shutter, (b) the use of Gas Electron Multiplier-based gaseous detectors for tracking and energy reconstruction device, and (c) the provision of a method for determining proton energy from a forward-search algorithm utilizing segmentation of energy detector ionization signal readout.

Conventional pCT systems are typically subject to range uncertainty as a result of photon CT conversion to proton stopping power. The inaccuracies create both anatomy and setup variation and may cause anatomical changes during treatment. The proton Computed Tomography system of the present invention enables real time 3D imaging, thus reducing the inaccuracies caused by CT conversion to proton stopping power. Prior art devices just record where the proton stops (stopping energy), thus getting the final energy level. The pCT of the present invention records the energy level all along the track, which improves resolution and 2D or 3D image construction. The GEM layers provide improved amplification over prior art devices.

The pCT system of the current invention will reduce target volume in proton therapy and reduce planning "margins", which is important when treating tumors close to critical structures such as the brain stem, optic chiasm, or the spinal cord. A pCT imaging according to the invention could replace x-ray imaging for patient alignment verification before treatment and facilitate adaptive planning.

The spatial resolution of the pCT system using GEM amplification provides superior spatial resolution of less than 1 mm water equivalence per plane and exiting proton energy as low as 50 MeV. As the invention has been described, it will be apparent to those skilled in the art that the same may be varied in many ways without departing from the spirit and scope thereof. Any and all such modifications are intended to be included within the scope of the appended claims.

We claim:

1. A method for creating tomographic images of a target Proton Computed Tomography (pCT), comprising:
   directing a stream of protons toward a target;
   measuring the proton trajectory of each proton before the target with a pre-tracker;
   measuring the proton trajectory of each proton after the target with a post-tracker;
   positioning a gaseous Time Projection Chamber (TPC) having a plurality of gas cells after the trackers to measure the proton energy after exiting the target by amplifying and measuring the profile of energy deposited along the proton trajectory through the TPC via the signal from ionization electrons liberated from proton energy loss in each gas cell;
   a variable energy degrading shutter between the post-tracker and the TPC, said shutter extending the dynamic range of the TPC and maintaining good energy resolution in the TPC;
   said shutter including a shutter encoder;
   recording data from the shutter encoder in the data stream for automatic correction of the energy loss in the shutter; and
   determining the proton energy by a search algorithm to determine the best match for the energy loss profile along the proton trajectory (dE/dx), with the stopping energy as the seed value for the search range.

2. The method of claim 1, wherein the TPC comprises:
   a series of absorbers equally spaced in order to divide the TPC into said plurality of gas cells, each of said cells including an inert gas therein;
   one or more Gas Electron Multiplier (GEM) layers; and
   applying an electric field to each of said gas cells to drift ionized electrons from each gas cell to the one or more GEM layers.

3. The method of claim 2, wherein the TPC comprises an electronic readout layer for receiving electrons from the one or more GEM layers: said readout layer having segmentation along the proton direction in order to determine the energy loss profile.

4. The method of claim 3, comprising:
   said electronic readout layer including a plurality of segmented electrodes on a PCB;
   an induced electric pulse generated by the electrons via induction; and
   front end electronics for amplifying and processing the electric pulse and sending the resultant data on each pulse to a computer for further processing.

5. The method of claim 2, comprising:
   the absorbers are equally spaced; and
   the absorbers are plastic film absorbers.

6. The method of claim 5, comprising the film absorbers are constructed of MYLAR®.

7. The method of claim 4, comprising:
- the total integrated charge of each induced electric pulse is proportional to the number of ionized electrons produced; and
- the total number of ionized electrons produced in each cell is proportional to the energy lost in that cell by protons passing through the gas.

8. The method of claim 7, comprising grouping clusters of signals from each cell to determine the energy deposited in each cell.

9. The method of claim 8, comprising determining the energy of the proton entering the TPC by measuring the stopping distance along the proton trajectory and the profile of the energy lost along the proton track.

10. The method of claim 2, wherein the TPC comprises:
- a chamber including a top plate with an inner surface; and
- a plurality of grooves for accepting said absorbers.

11. The method of claim 2, comprising said electric field applied to said gas cells 1 kV/cm.

12. The method of claim 1, wherein the shutter comprises inserting one or more absorbers of different thicknesses before the TPC.

13. The method of claim 12, comprising the encoder to record the thickness of said one or more inserted absorbers.

14. The method of claim 2, wherein each of said absorbers in said series of absorbers are 0.3 mm thick MYLAR®.

15. The method of claim 14, wherein said TPC comprises 50 of said gas cells having a total length per cell of 1 cm.

16. The method of claim 15, wherein said TPC comprises an energy range up to 48 MeV for protons stopping in the TPC.

17. The method of claim 16, wherein said TPC comprises a reconstructed energy resolution of less than 300 keV on average across the energy range based on fitting the energy loss profile and a measurement resolution of 10% per cell not including the energy straggling.

18. The method of claim 17, wherein said absorbers in said TPC stops protons with less than 1 MeV kinetic energy.

* * * * *